US012742320B2

(12) United States Patent
Koska et al.

(10) Patent No.: US 12,742,320 B2
(45) Date of Patent: Sep. 22, 2026

(54) SLUDGE RETAINING DEVICE FOR A DRAIN OF A SANITARY BASIN

(71) Applicant: BLANCO GMBH + CO KG, Oberderdingen (DE)

(72) Inventors: Reinhard Koska, Karlsruhe (DE); Manuel Frank, Oberderdingen (DE); Georg Kahl-Marburger, Neckarsulm (DE)

(73) Assignee: BLANCO GMBH + CO KG, Oberderdingen (DE)

( * ) Notice: Subject to any disclaimer, the term of this patent is extended or adjusted under 35 U.S.C. 154(b) by 750 days.

(21) Appl. No.: 18/112,286

(22) Filed: Feb. 21, 2023

(65) Prior Publication Data

US 2023/0264999 A1 Aug. 24, 2023

(30) Foreign Application Priority Data

Feb. 22, 2022 (DE) ..................... 10 2022 201 844.3

(51) Int. Cl.

| | |
|---|---|
| ***E03C 1/264*** | (2006.01) |
| ***A47K 1/14*** | (2006.01) |
| ***B01D 29/03*** | (2006.01) |
| *B01D 35/28* | (2006.01) |
| *B01D 39/10* | (2006.01) |

(52) U.S. Cl.

CPC ................ *E03C 1/264* (2013.01); *A47K 1/14* (2013.01); *B01D 29/035* (2013.01); *B01D 35/28* (2013.01); *B01D 39/10* (2013.01)

(58) Field of Classification Search

None

See application file for complete search history.

(56) References Cited

U.S. PATENT DOCUMENTS

| | | | | |
|---|---|---|---|---|
| 2,736,577 | A | 2/1956 | Mackey | |
| 3,027,569 | A * | 4/1962 | Lantz | E03C 1/262 4/295 |
| 3,800,339 | A | 4/1974 | Bergin | |
| 2018/0202136 | A1 | 7/2018 | Karnegie | |

FOREIGN PATENT DOCUMENTS

| | | | |
|---|---|---|---|
| AU | 2003204241 | | 12/2003 |
| AU | 2003204241 | A1 * | 12/2003 |
| CN | 205712360 | | 11/2016 |
| DE | 10 2012 215 764 | | 3/2014 |
| JP | 2003-74102 | | 3/2003 |

* cited by examiner

*Primary Examiner* — Clare M Perrin

(74) *Attorney, Agent, or Firm* — Wenderoth, Lind & Ponack, L.L.P.

(57) ABSTRACT

A sludge retention device, for a drain of a sanitary basin, includes a sieve surface which extends from a higher surface region to a lower surface region, and a handle which is arranged in the lower surface region on the sieve surface. The handle includes a flow disruptor for a flow of a liquid towards the lower surface region. The flow disruptor is configured to at least partially break up the flow of the liquid.

20 Claims, 15 Drawing Sheets

SLUDGE RETAINING DEVICE FOR A DRAIN OF A SANITARY BASIN

BACKGROUND OF THE INVENTION

1. Field of the Invention

The invention relates to a sludge retaining device for a drain of a sanitary basin, in particular of a sink or the like, comprising a sieve surface, which is formed extending from a higher to a lower surface region, and a handle device, which is arranged in the region of the lower surface region on the sieve surface.

The invention further relates to a drainage cup for use in a drain valve of a sanitary container, in particular of a sink, of a wash basin or the like.

Although the present invention is applicable in general to any sludge retaining device, the present invention will be explained with respect to sludge retaining devices in drain assemblies for sinks.

2. Description of the Related Art

Sinks, for example in kitchens, usually have a drain assembly, which is used to drain rinse water from the sink. To prevent sludge from reaching the pipe connected to the drain assembly, it is known to use so-called basket strainers to this end, which make it possible to drain the waste water and simultaneously retain coarse dirt such as food debris or the like. For cleaning purposes, the basket strainer has a handle, with which the basket strainer can be removed from the drain assembly. A user subsequently removes the residual dirt and the basket strainer is then inserted into the drain assembly clean again. The basket strainer is formed in a known manner in the form of a flat bowl, which has outlet openings for draining the waste water. In addition, in a likewise known manner, the handle is arranged in the middle of the basket strainer. To improve gripping and prevent irritations when gripping the handle, the handle and the transition from the sieve surface to the handle are rounded.

The disadvantage with this approach is that, in the case of an unfavorable angle to the liquid jet striking the sieve surface, for example, from an outlet of a sanitary fitting arranged above the basket strainer, the liquid flows rapidly in the direction of the handle and from there sprays upward towards the user of the sanitary fitting.

SUMMARY OF THE INVENTION

Therefore, an object of this invention is to provide a sludge retaining device and a drainage cup which can be cost-effectively manufactured, at least partially suppressing or preventing in a simple and reliable manner a spraying of a liquid jet towards a user and simultaneously providing an attractive look and feel.

A further object of this invention is to provide an alternative sludge retaining device and an alternative drainage cup.

The present invention meets the aforementioned objects concerning a sludge retaining device for a drain of a sanitary basin, in particular of a sink or the like, comprising a sieve surface, which is formed extending from a higher to a lower surface region, and a handle device, which is arranged in the region of the lower surface region on the sieve surface, in that the handle device comprises a flow disruption device, in particular a recess, for the flow of a liquid, which flows towards the lower surface region, such that the flow of the liquid is at least partially broken up by the flow disruption device.

In addition, the present invention meets the aforementioned objects concerning a drainage cup for use in a drain valve of a sanitary container, in particular of a sink, of a wash basin or the like, in that a sludge retaining device is provided.

An advantage achieved herein is that, in a simple and reliable manner, a spraying of a liquid jet towards a user can be at least partially suppressed. By means of the recess the flow of the liquid in particular is directed at least partially in the original direction, however, at least some flow of the liquid is partially reduced at an acute angle, perpendicular to the actuation direction of the sludge retaining device, in particular in the vertical direction. A further advantage is that an attractive look and feel can be achieved at the same time.

The term “sanitary” is meant in the broadest sense, and relates generally to the kitchen, bathroom or laundry as well as heating.

The term “sieve surface” is to be understood in the broadest sense and relates, in general to any three-dimensional bodies, devices or apparatuses which comprise a section, a surface or a region, which provides a sieve and/or retaining effect for particles or the like in a liquid.

The term “flow disruption device” is to be understood in the broadest sense and relates, in general to any apparatus or device which comprises a section, a surface or a region, which is designed to alter the flow direction of a liquid abruptly and/or with a discrete curve, such that at least a portion of the liquid is directed substantially back in the original direction of the flow of the liquid. The flow disruption device provides the mentioned effect of an abrupt change in the flow direction, in particular in the event of slow or small liquid quantities, compared to the volume of the sieve surface and height of the handle device over the lowest region of the sieve surface.

Further features, advantages and further embodiments of the invention are described below or are made apparent thereby.

According to a preferred embodiment of the invention, the sludge retaining device is formed in one part or in multiple parts, in particular in four parts. The advantage of a one-part design is the ease of operation. The advantage of a design in multiple parts is simple production and greater flexibility with respect to the design of the respective parts.

According to a further preferred embodiment of the invention, the handle device is arranged detachably on the sieve surface, in particular by means of a snap-on connection. An advantage One of the advantages achieved thereby is a rapid assembly and disassembly, which allows for a particularly reliable and thorough cleaning of the sludge retaining device.

According to a further preferred embodiment of the invention, the handle device can be fixed in an opening of the sieve surface. This provides a rapid and easy attachment of the handle device on the sieve surface.

According to a further preferred embodiment of the invention, the handle device is formed in one part or multiple parts, in particular in two parts, comprising at least a base body and a cap. The advantage of this is that a rapid and easy installation of the handle device can be provided. In addition, an easy individualization for different users is possible by means of a cap. For example, the cap can be furnished with a coating, in particular paint or the like. A single part handle device is easy to produce and enables a rapid assembly on the sieve surface.

According to a further preferred embodiment of the invention, the handle device can be fixed on the sieve surface on different sides of the sieve surface. The advantage of this is that a particularly reliable attachment of the handle device is made possible, since the handle device is secured in this manner for example against an applied force parallel to the actuation direction.

According to a further preferred embodiment of the invention, the handle device and the opening are designed to be interactive in order to provide a rotation prevention device of the handle device in the opening, in particular wherein the opening has a clover leaf design. An advantage One of the advantages achieved thereby is that a reliable handling of the sludge retaining device is made possible and irritations of the user in the operation of the sludge retaining device are prevented.

According to a further preferred embodiment of the invention, the flow disruption device, in particular the recess, is arranged on the base body. The advantage of this is that a great visual impression or a valuable impression can be achieved in the operation of the sludge retaining device.

According to a further preferred embodiment of the invention, the cap is attached by means of positive-locking, adhesive bonding or friction bonding on the base body, in particular by means of pressing and/or adhesive bonding. The advantage of this is a simple and simultaneously reliable attachment of the cap on the base body.

According to a further preferred embodiment of the invention, the cap protrudes at least partially beyond the flow disruption device, in particular, beyond the recess. On the one hand, this conceals or covers the flow disruption device, in particular the recess, so that an attractive look is maintained. Simultaneously, the effect of the flow disruption device, in particular of the recess, can be further increased in this manner, in that a space enclosed in three directions, in particular in the form of a cavity, is partially formed.

According to a further preferred embodiment of the invention, the base body comprises at least two radial projections circumferentially distributed. This provides a reliable friction-type connection of the cap on the base body by sliding the cap over the projections. To facilitate this, the projections can be beveled, rounded off or the like in the corresponding direction.

According to a further preferred embodiment of the invention, the flow disruption device, in particular the recess, comprises a recess, in particular wherein the recess comprises at least one edge of at least degrees. This, on the one hand, makes the recess less conspicuous in a particularly reliable manner, and also improves the effect of the recess concerning the interruption and partial redirection of the flow of the liquid.

According to a further preferred embodiment of the invention, the handle device comprises at least one handle outlet opening, in particular in the form of a slot. This prevents, for example, liquid standing in the region of the handle device, and simultaneously liquid can be discharged directly from this region to suppress spraying. Preferably, the sieve surface in the region of the handle device here is made flat or horizontal.

According to a further preferred embodiment of the invention, the sieve surface comprises at least two sieve outlet openings for the passage of liquid, in particular in the form of slots. This way the retention of sludge and the like can be facilitated in simple and visually appealing manner, while simultaneously discharging the liquid.

According to a further preferred embodiment of the invention, the sieve outlet openings are arranged at least partially in the lower region, and are in particular connected to the opening of the sieve surface. The advantage of this is a simple production of the sieve surface and the opening with simultaneous greater liquid discharge.

According to a further preferred embodiment of the invention, the sieve surface comprises at least one web protruding from the sieve surface, in particular wherein the at least one web is arranged in the form of a ring around the opening of the sieve surface. This improves, on the one hand, the reliability of the attachment of the handle device, while on the other hand the stability of the sieve surface is improved. This also facilitates a simpler production.

According to a further preferred embodiment of the invention, the web comprises web outlet openings, in particular wherein the web outlet openings and/or the handle outlet openings correspond to the sieve outlet openings of the sieve surface and/or are connected to them. An advantage One of the advantages achieved thereby is that an even greater liquid discharge is made possible.

Further important features and embodiments are described in greater detail in the dependent claims, the drawings and the accompanying description of the figures based on the drawings.

It should be understood that the features mentioned above and those to be explained below can be used not only in the combination indicated in each case, but also in other combinations or on their own, without departing from the scope of this invention.

Preferred embodiments and embodiments of the invention are shown in the drawings and will be explained in more detail in the following description, wherein identical reference numerals refer to identical or similar or functionally identical components or elements.

DETAILED DESCRIPTION OF THE INVENTION

Figure 1:
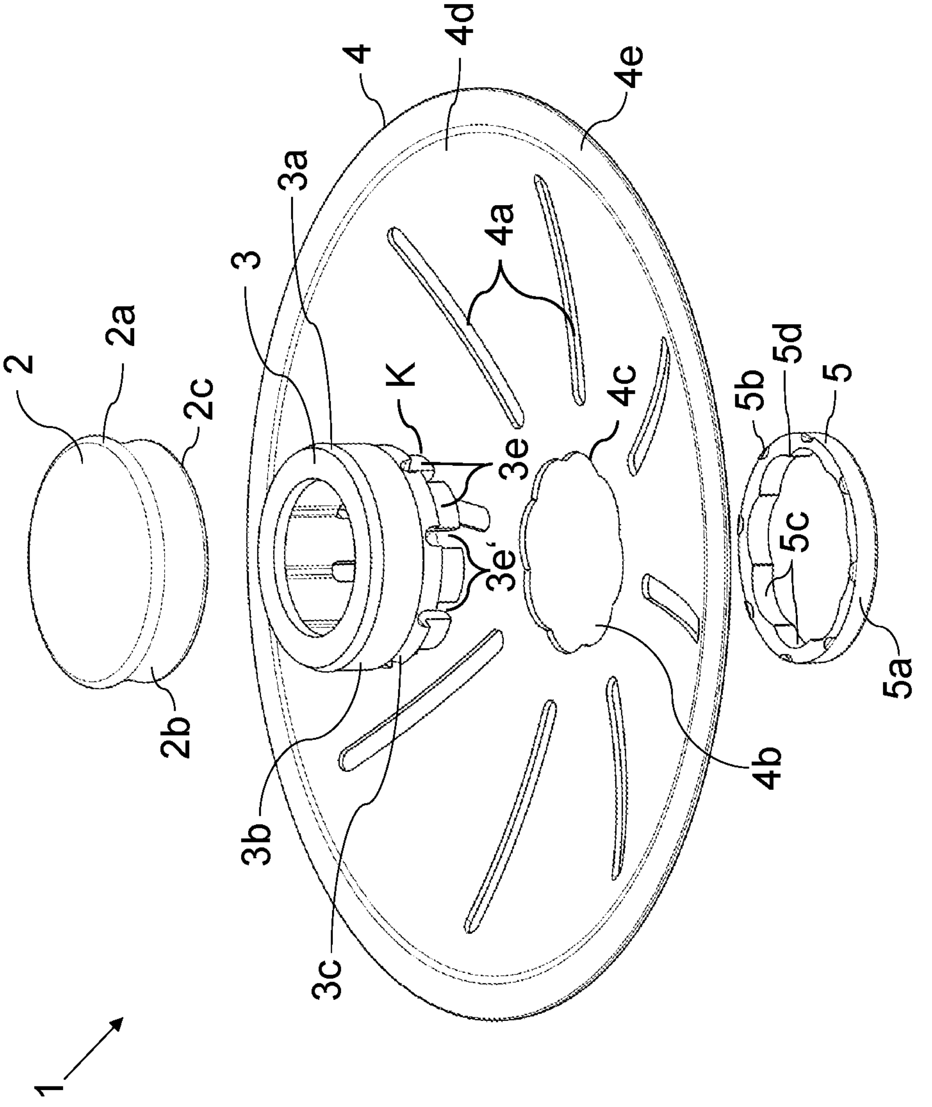
FIG. 1 shows a basket strainer according to an embodiment of this invention in an exploded view.
Figure 2:
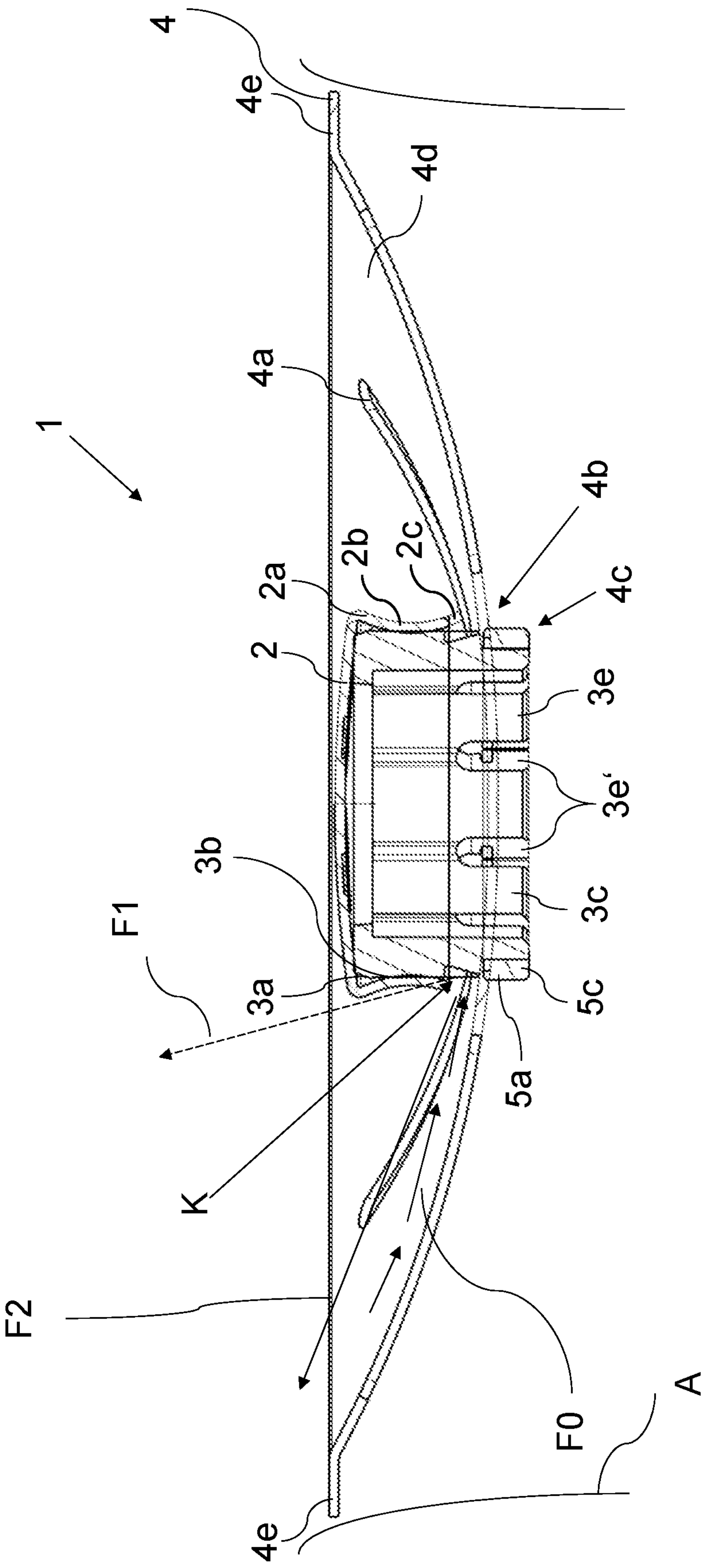
FIG. 2 shows a basket strainer according to an embodiment of this invention in cross-section.

FIGS. 1 and 2 show a basket strainer according to an embodiment of this invention in an exploded view and in cross-section.

FIGS. 1 and 2 show a basket strainer 1 in a drainage cup A (only FIG. 2). The basket strainer 1 is formed of multiple parts and comprises a sieve surface 4 and a handle, comprising a base body 3, which has a cap 2. The base body 3 is partially guided through an opening 4*b* of the sieve surface 4 and fixed by means of a snap ring 5 on the opposite side of the sieve surface 4.

In detail, the substantially cylindrical cap 2 has a rounded off projection in its upper region 2*a*. The central region 2*b* of the cap is curved inward in radial direction, such that the edge of the cap 2 in the lower region 2*c* has substantially the same external diameter as the upper region 2*a*.

The base body 3 is substantially embodied in the form of a ring. In the upper region 3*a* the ring has a protruding ledge beveled in the direction of the sieve surface. In the central region 3*b* the lateral surface, in cross-section, extends straight, in the lower region 3*c* the ring has a recess K to form the separating edge. The recess K is triangular in cross-section, wherein a 90-degree angle is formed between the central region 3*b* and the separating edge. Furthermore, the base body 3 has brackets 3*e* protruding vertically in the lower region 3*c* between which slots 3*e*' are formed.

If liquid flows in direction F0, thus in the direction of the handle 2, 3, the flow is diverted less strongly upward via the recess K (Reference numeral F2) than would be the case without recess K, in particular in the case of rounding (Reference numeral F1). The same also applies for further FIGS. 3-10.

The sieve surface 4 is embodied in the form of a flat bowl with a circumferential flat, horizontal edge 4*e* on the outside, which merges into a bent, sloping surface 4*d*. Oblong slots 4*a* aligned in radial direction are arranged circumferentially evenly distributed in the bent surface 4*d*. An opening 4*b* is embodied in the lowest region in the middle of the sieve surface 4, said opening having a clover leaf cross-section.

The snap ring 5 has a cylindrical shape with circumferential surface 5*a* and has in cross-section on its inside a clover leaf cross-section corresponding to the opening 4*b* with indentations 5*c*. On its upper side, that is, on the surface oriented towards the sieve surface 4, the snap ring 5 has vertical projections 5*b*, the position of which corresponds to the indentations, more specifically, protrusions of the clover leaf shaped extension of the inside.

For the assembly of the basket strainer 1, the cap 2 is first placed on the base body 3 and thereby fixed through positively and/or materially locking, for example by means of adhesive bonding. Then, the lower portion of the base body 3 shown in FIGS. 1 and 2 is inserted through the opening 4*b* of the sieve surface 4, so that the brackets 3*e* penetrate through the opening 4*b*. Subsequently, the brackets 3*e* are fixed to the snap ring 5 on the opposite side. For example, this occurs by means of adhesive bonding the brackets 3*e* to the snap ring 5. The brackets 3*e* correspond to the protrusions 4*c* of the inside of the opening 4*b*, the slots 3*e*' correspond to the projections between two protrusions 4*c*. In this way, a rotation prevention device of the handle 2, 3 can be provided with respect to the sieve surface 4. The vertical projections 5*b* of the snap ring 5 are used for correct spacing of the snap ring 5 and of the brackets 3*e* with respect to the opening 4*b*.

The cap 2 and/or base body 3 and/or sieve surface 4 and/or snap ring 5 can in each case be made at least partially, in particular completely, of metal and/or plastic. For example, the plastic can comprise polyamide and polypropylene and/or be glass fiber reinforced. The cap 2 and/or the sieve surface 4 can be coated, for example with paint or the like.

Figure 3:
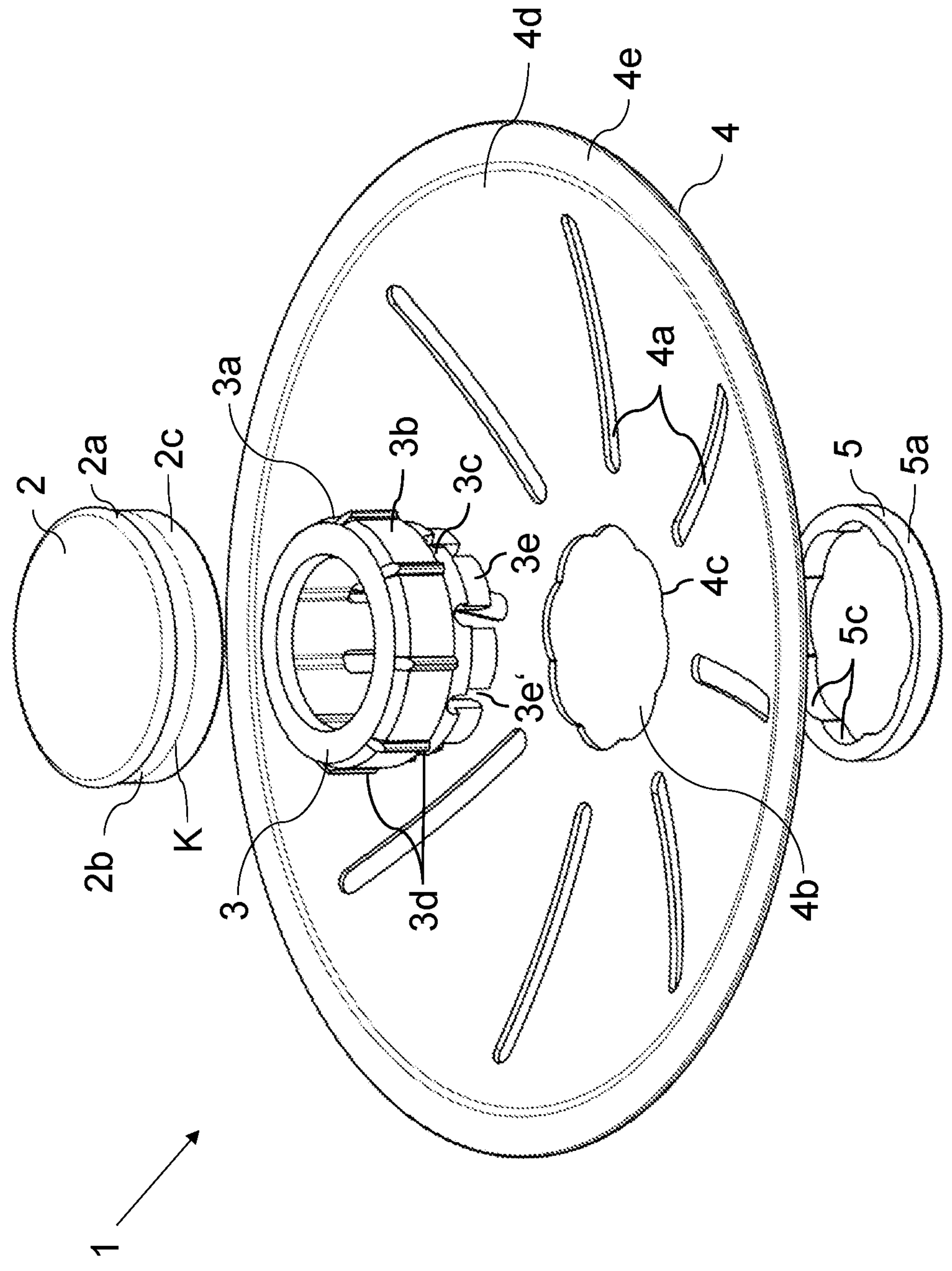
FIG. 3 shows a basket strainer according to an embodiment of this invention in an exploded view.
Figure 4:
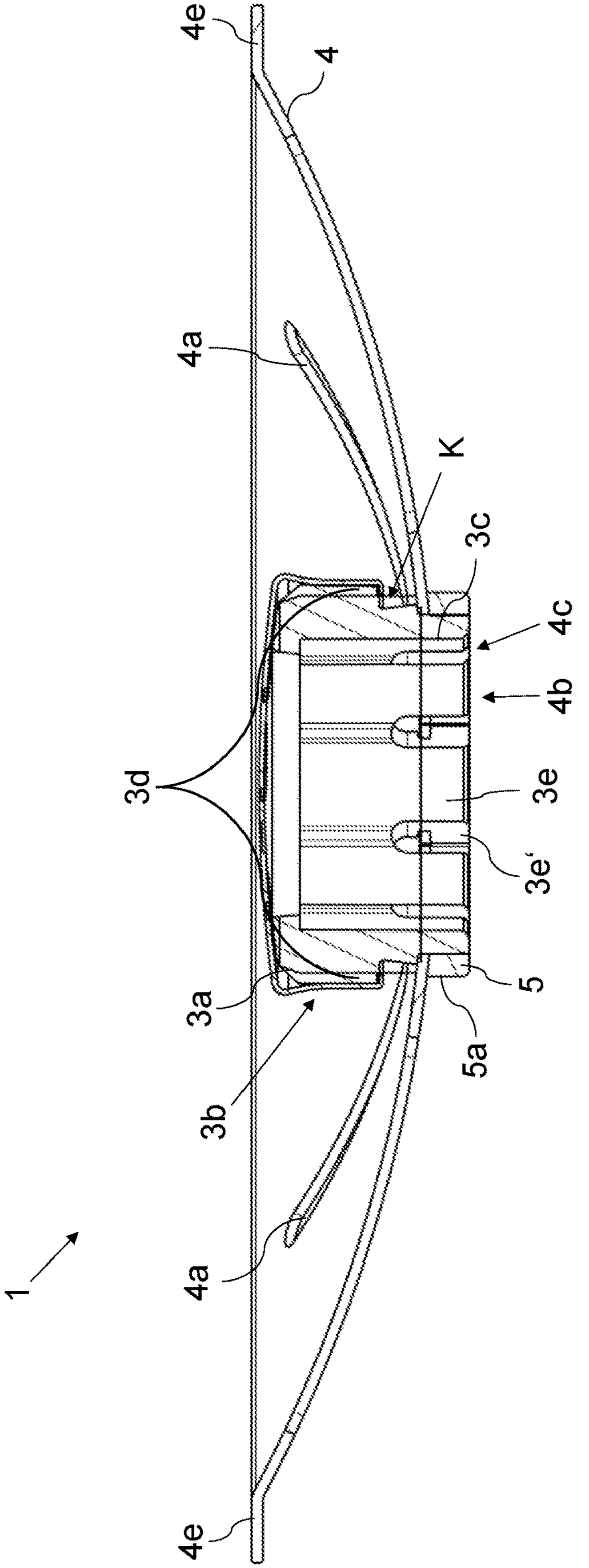
FIG. 4 shows a basket strainer according to an embodiment of this invention in cross-section.

FIGS. 3 and 4 show a basket strainer according to an embodiment of this invention in an exploded view and in cross-section.

FIGS. 3 and 4 show substantially a basket strainer 1 according to FIGS. 1 and 2. In contrast to the basket strainer 1 according to FIGS. 1 and 2, the basket strainer 1 according to FIGS. 3 and 4 has a cap 2, which is radially curved inward in the central region 2*b*. In other words, it is formed in the shape of a segment of a circle in cross-section in the central region. In addition, the lower edge of the lower region 2*c* of the cap 2 is completely or partially bent radially inward. This, likewise, applies for all other embodiments. Similarly, radial projections 3*d* extend over the upper and central region 3*a*, 3*b* of the base body 3, said radial projections which have a triangular shape in cross-section, extending substantially in vertical direction into regions 3*a*, 3*b* and which are arranged in regular fashion on the radial outside of the base body 3.

By means of the mentioned projections 3*d*, the cap 2 can be attached through frictional locking on the base body 3. For easier assembly of the cap 2, the projections 3*d* can be rounded or flattened in the upper region.

Figure 5:
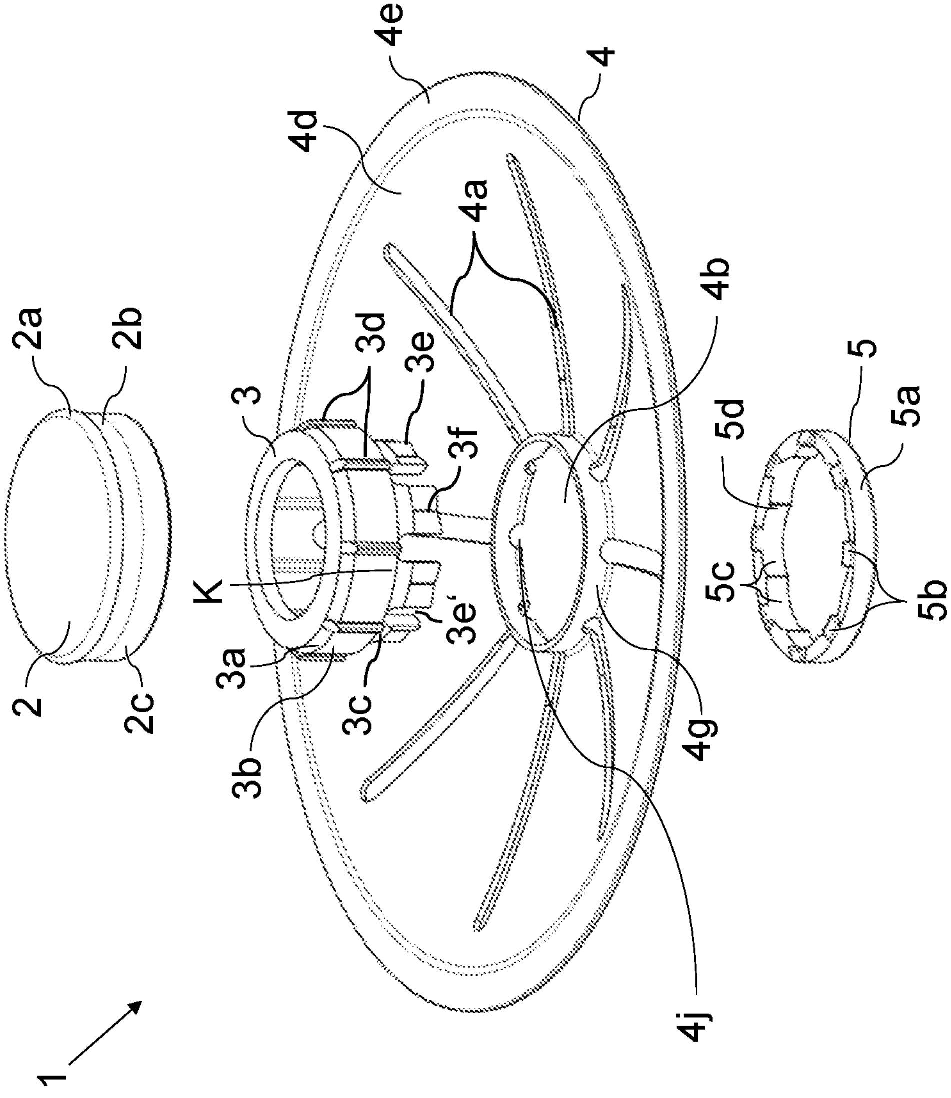
FIG. 5 shows a basket strainer according to an embodiment of this invention in an exploded view.
Figure 6:
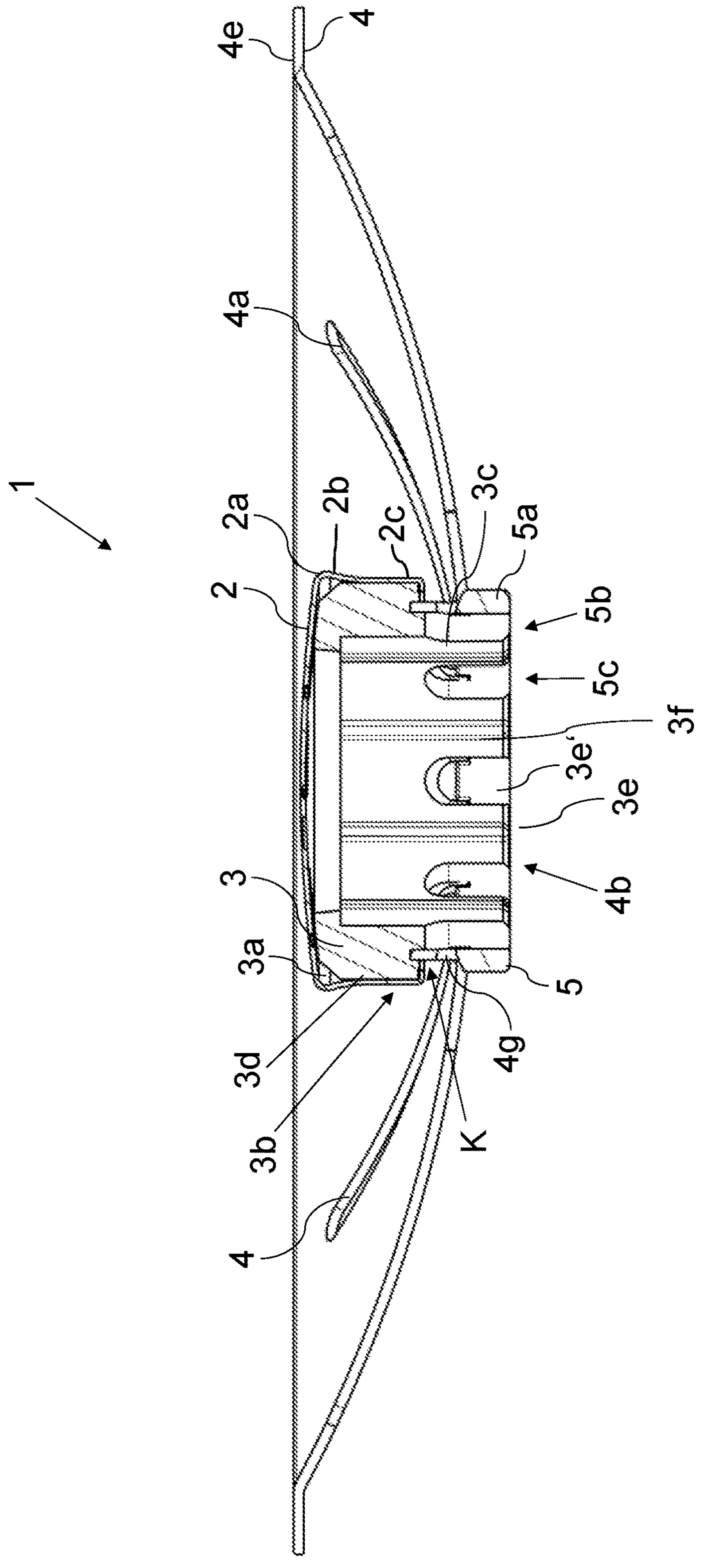
FIG. 6 shows a basket strainer according to an embodiment of this invention in cross-section.

FIGS. 5 and 6 show a basket strainer according to an embodiment of this invention in an exploded view and in cross-section.

FIGS. 5 and 6 show substantially a basket strainer 1 according to FIGS. 3 and 4. In contrast to the basket strainer 1 according to FIGS. 3 and 4, the basket strainer 1 according to FIGS. 5 and 6 has brackets 3*e* on the base body 3, which are the in the direction of the radial inside of the base body 3 chamfered to the rear. In other words, the brackets are V-shaped, wherein the respective edge 3*f* runs vertically and is arranged radially further inward.

Furthermore, compared to the sieve surface 4 according to FIGS. 1 to 4, the sieve surface 4 has differences. For one thing, a vertical circumferential web 4*g* extends around the opening 4*b* in the direction of the base body 3 upward, For another thing, the opening slot 4*a* is likewise connected to the opening 4*b* as well as to web outlet openings 4*j* extending in vertical direction. The vertical projections 5*b* of the snap ring 5 on its upper side are embodied such that they engage in the opening slot 4*a* of the sieve surface 4 in the region of the web 4*g*. Similarly, the V-shaped edge 3*f* of the brackets 3*e* engages in a projection 5*d* of the clover leaf-shaped embodiment of the Inner surface of the snap ring 5. Therewith a rotation prevention device can be provided.

Figure 7:
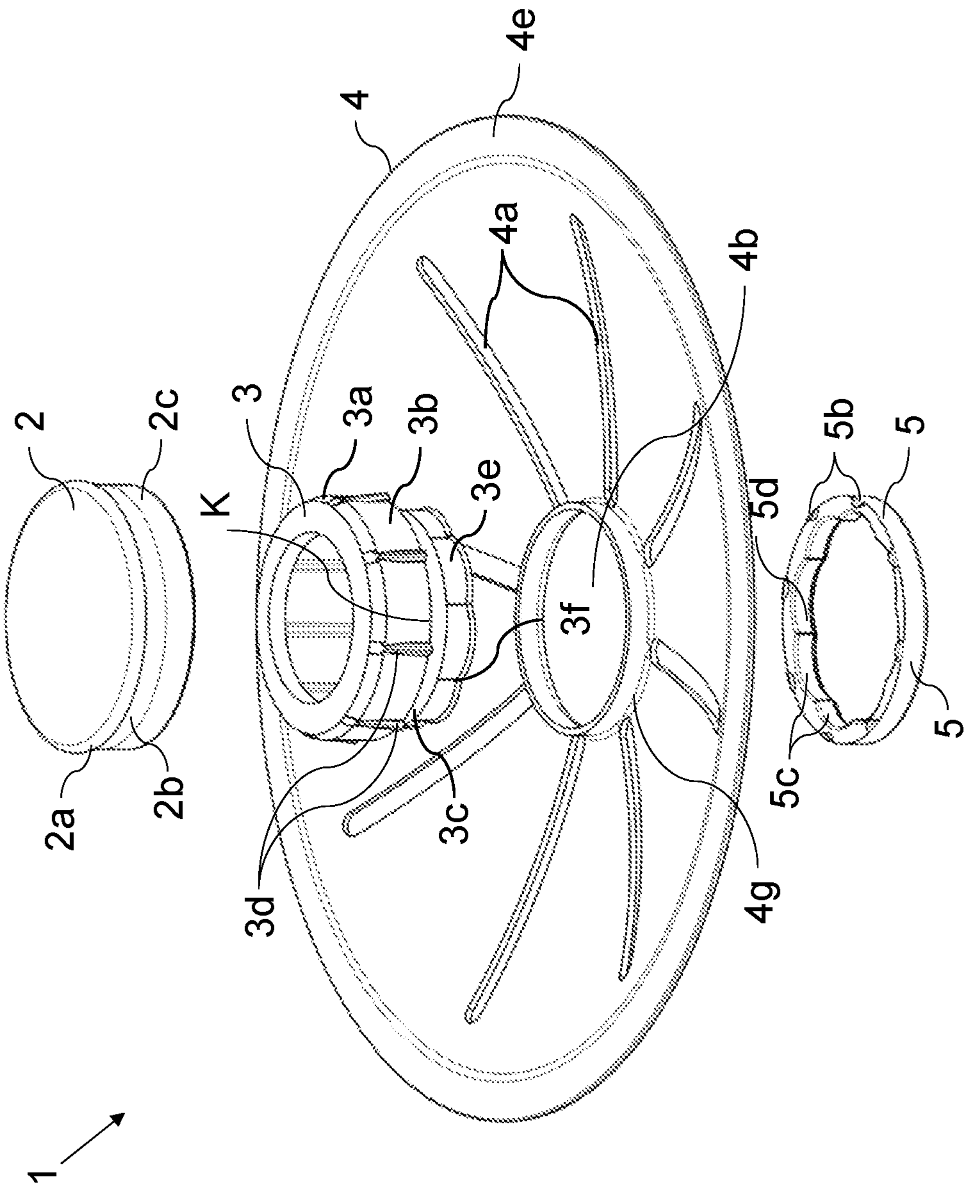
FIG. 7 shows a basket strainer according to an embodiment of this invention in an exploded view.
Figure 8:
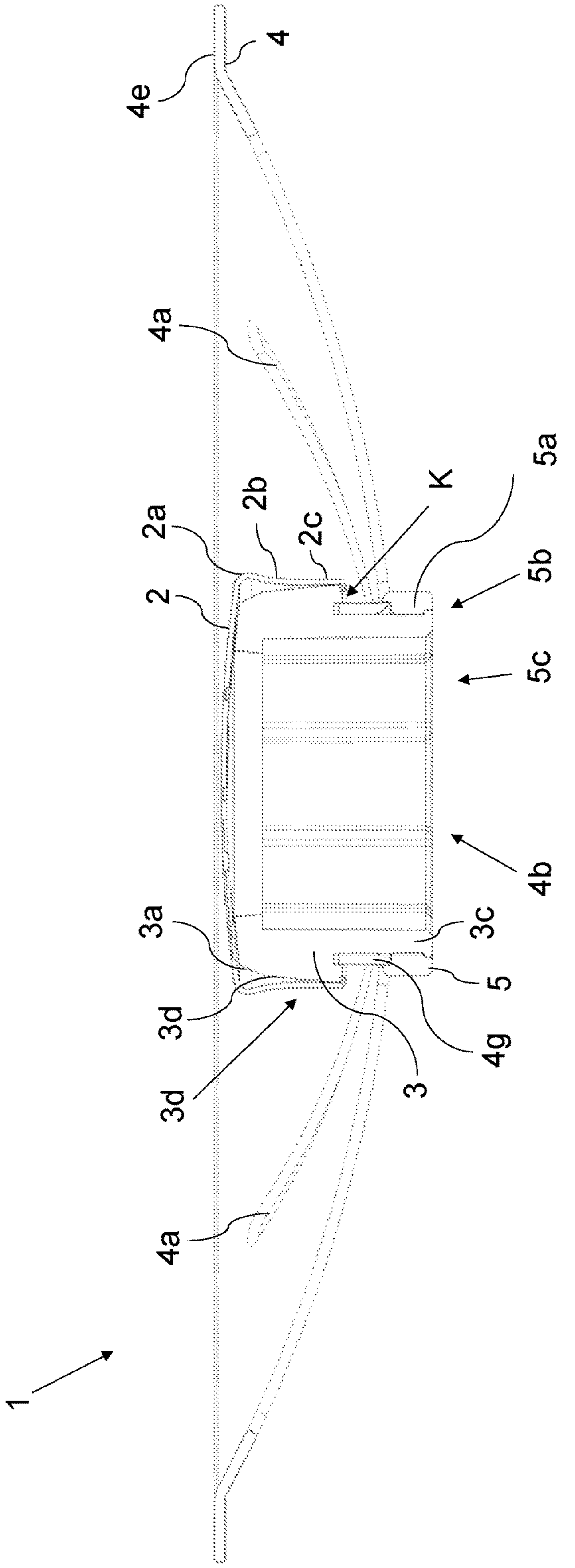
FIG. 8 shows a basket strainer according to an embodiment of this invention in cross-section.

FIGS. 7 and 8 show a basket strainer according to an embodiment of this invention in an exploded view and in cross-section.

FIGS. 7 and 8 show substantially a basket strainer 1 according to FIGS. 5 and 6. In contrast to the basket strainer 1 according to FIGS. 5 and 6, the basket strainer 1 according to FIGS. 7 and 8 has brackets 3*e* on the base body 3, which are bulged in the direction of the radial outside. In this respect, an inverse "clover leaf" shape arises. Slots (Reference numeral 3*e*' in FIGS. 1 to 6) no longer exist between the brackets 3*e*.

Furthermore, the sieve surface 4 has at least one difference compared to the sieve surface 4 according to FIGS. 1 to 6. The opening slots 4*a* of the basket strainer 1 of FIGS. 7 and 8 extend to the opening 4*b*, however are not connected to it. Similarly, the opening slots 4*a* do not extend to the web 4*g*. The clover leaf shape of the snap ring 5 corresponds to the "clover leaf" shape of the brackets 3*e* of the base body 3 for its attachment on the sieve surface 4, so that in this way a positive connection-reference numeral 3*e* and 5*c* and reference numeral 3*f* and 5*d* engage- and thus a rotation prevention device can be provided.

Figure 9:
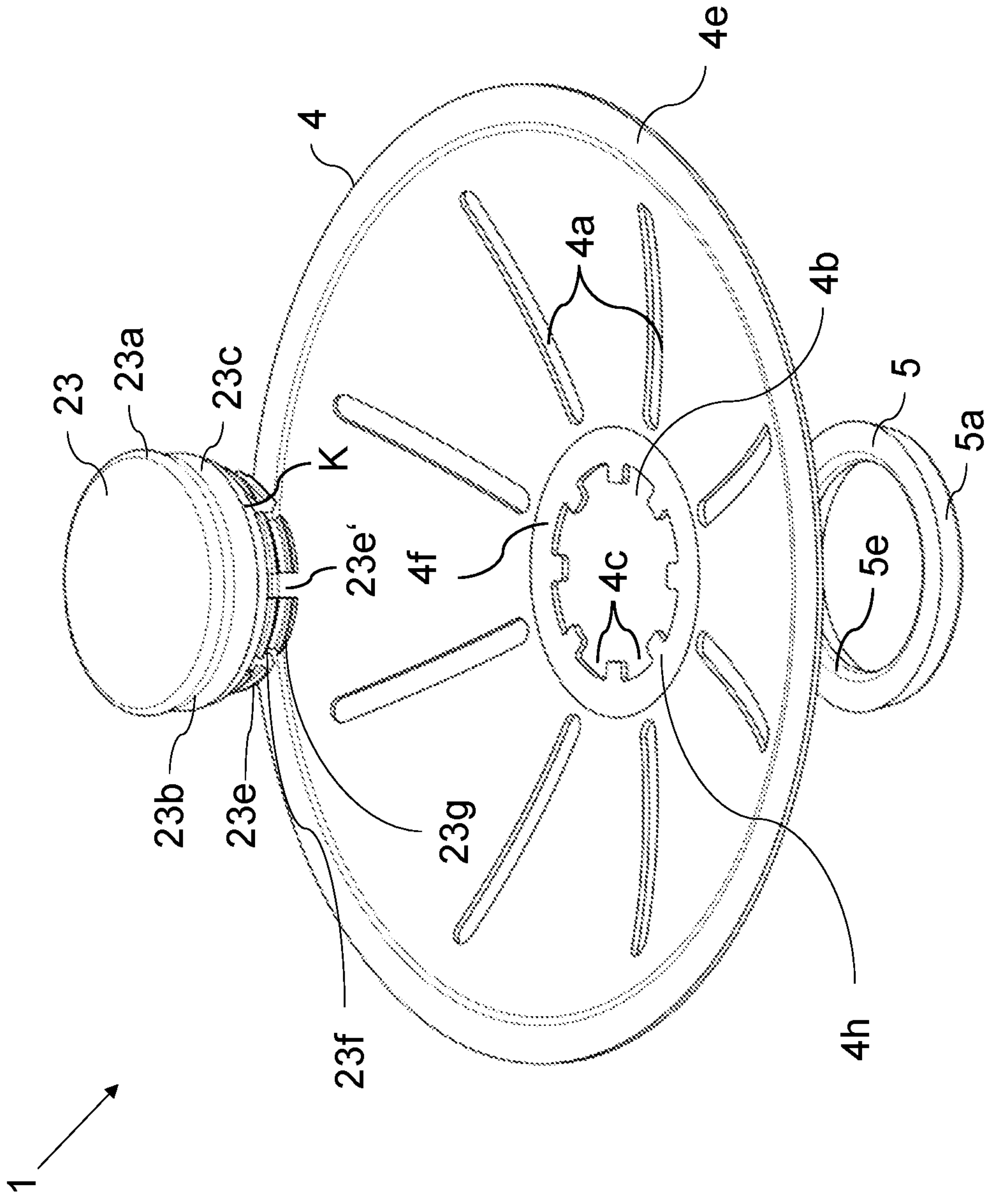
FIG. 9 shows a basket strainer according to an embodiment of this invention in an exploded view.
Figure 10:
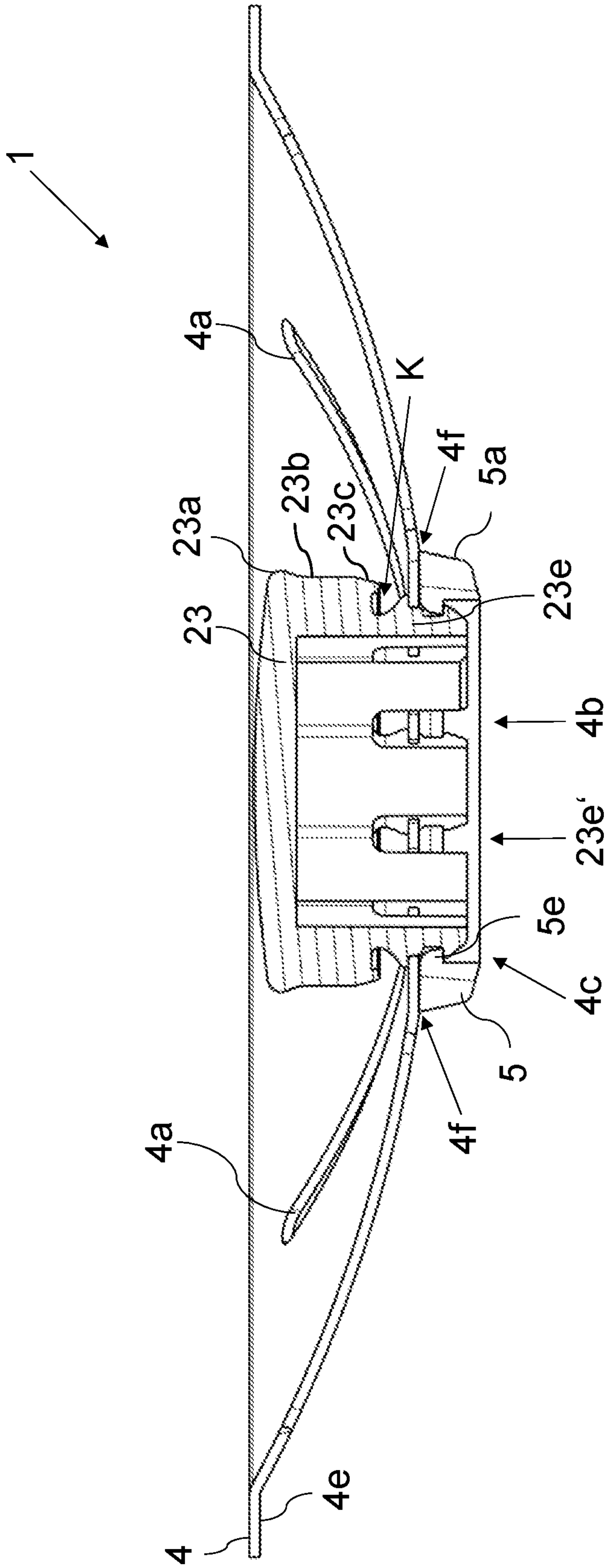
FIG. 10 shows a basket strainer according to an embodiment of this invention in cross-section.

FIGS. 9 and 10 show a basket strainer according to an embodiment of this invention in an exploded view and in cross-section.

FIGS. 9 and 10 show substantially a basket strainer 1 according to FIGS. 3 and 4. In contrast to the basket strainer 1 according to FIGS. 3 and 4, the basket strainer 1 according to FIGS. 9 and 10 has a single part handle 23, which on its upper side corresponds to the cap 2 of FIGS. 1 and 2, in particular the regions 23*a*, 23*b*, 23*c* correspond substantially to regions 2*a*, 2*b*, 2*c* of the cap 2 according to FIGS. 3 and 4. On the underside, the handle 23, as is also the case with the base body 3 according to FIGS. 3 and 4, has circumferential brackets 23*e* and slots 23*e*'. Furthermore, two projections 23*f*, 23*g* are arranged in circumferential direction around the base body 3—only interrupted by slots 23*e*'—on the brackets 23*e* spaced vertically apart from one another.

Furthermore, the sieve surface 4 has one difference compared to the sieve surface 4 according to FIGS. 1 to 8. Instead of the "clover leaf shape" of opening 4*b*, it is circular with rectangular teeth 4*h* protruding inward. Furthermore, the region 4*f* around the opening 4*b* is flattened, thus horizontal and parallel to edge 4*e*. The vertical projections 5*b* of the snap ring 5 are not present, instead there is a projection 5*e* protruding radially inward, which, after successful assembly of the handle 23 engages in the opening 4*b* in the region between the two circumferential projections of the brackets 23*e*. The recess K is embodied in cross-section in the form of a rounded recess, which extends partially upward in vertical direction.

Figure 11:
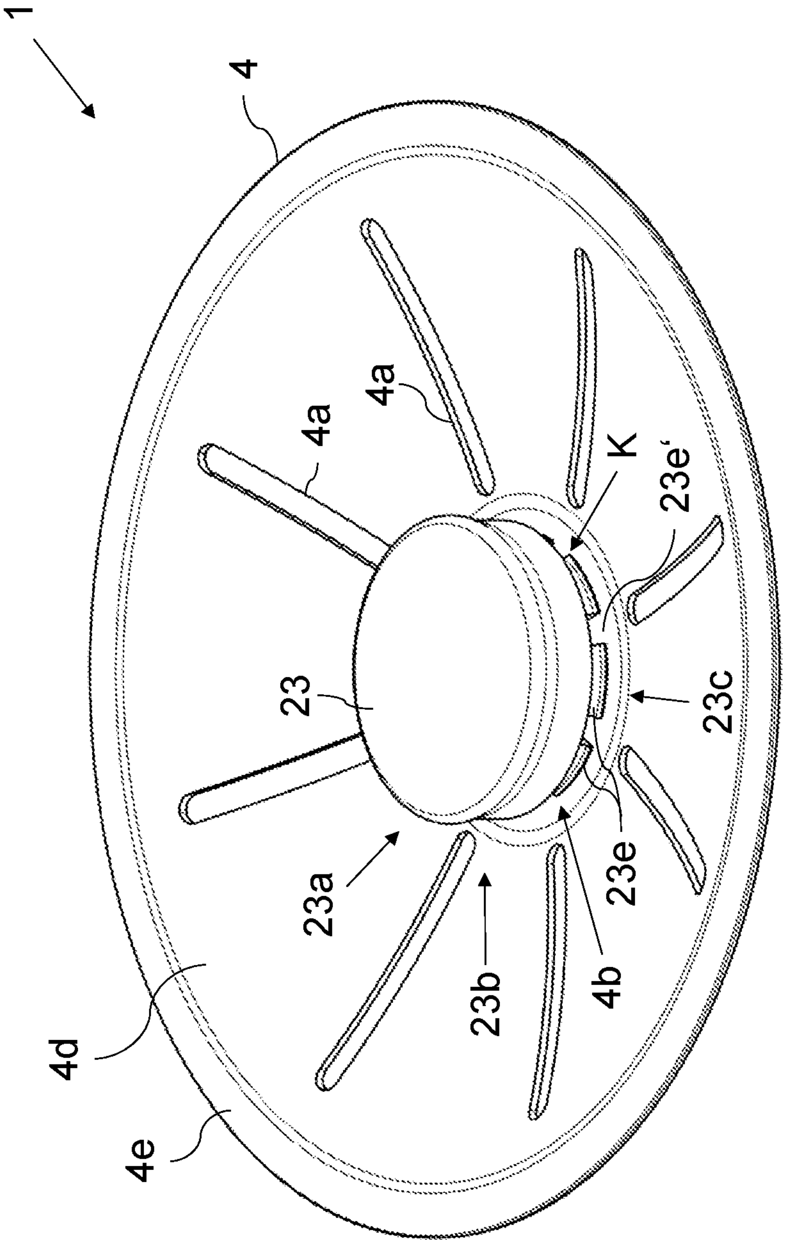
FIG. 11 shows a basket strainer according to an embodiment of this invention in an exploded view.
Figure 12:
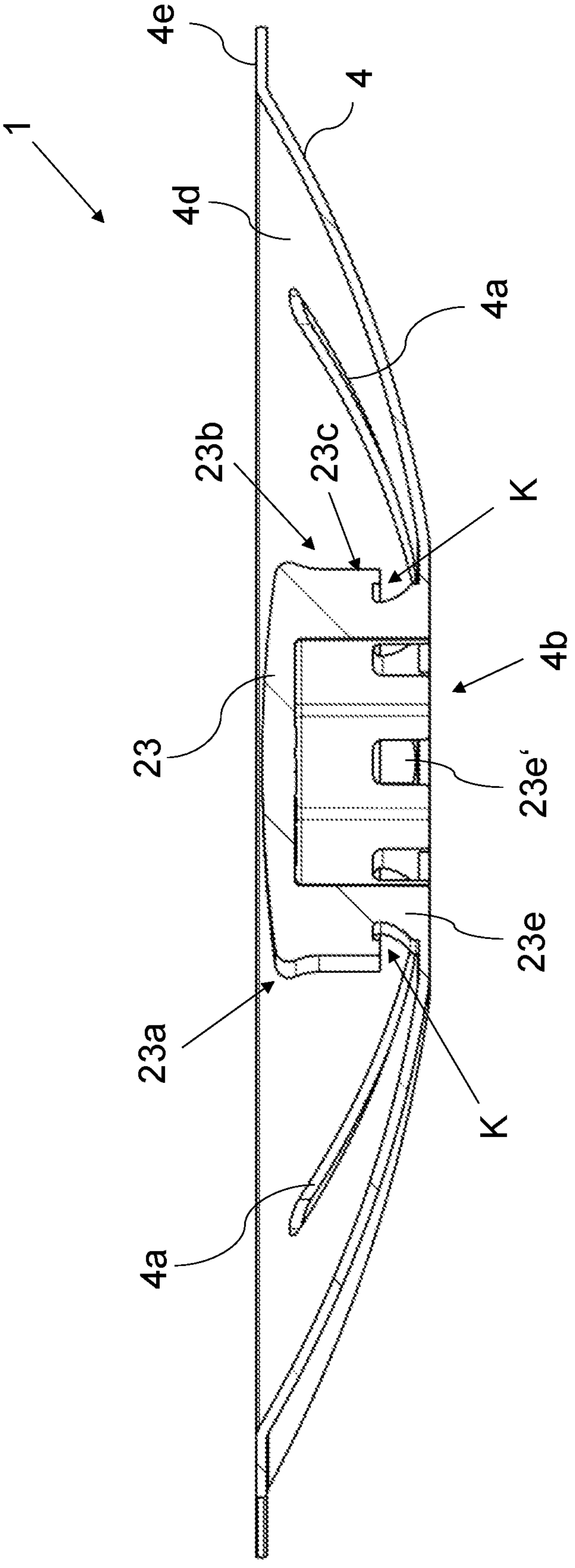
FIG. 12 shows a basket strainer according to an embodiment of this invention in an overview.
Figure 13:
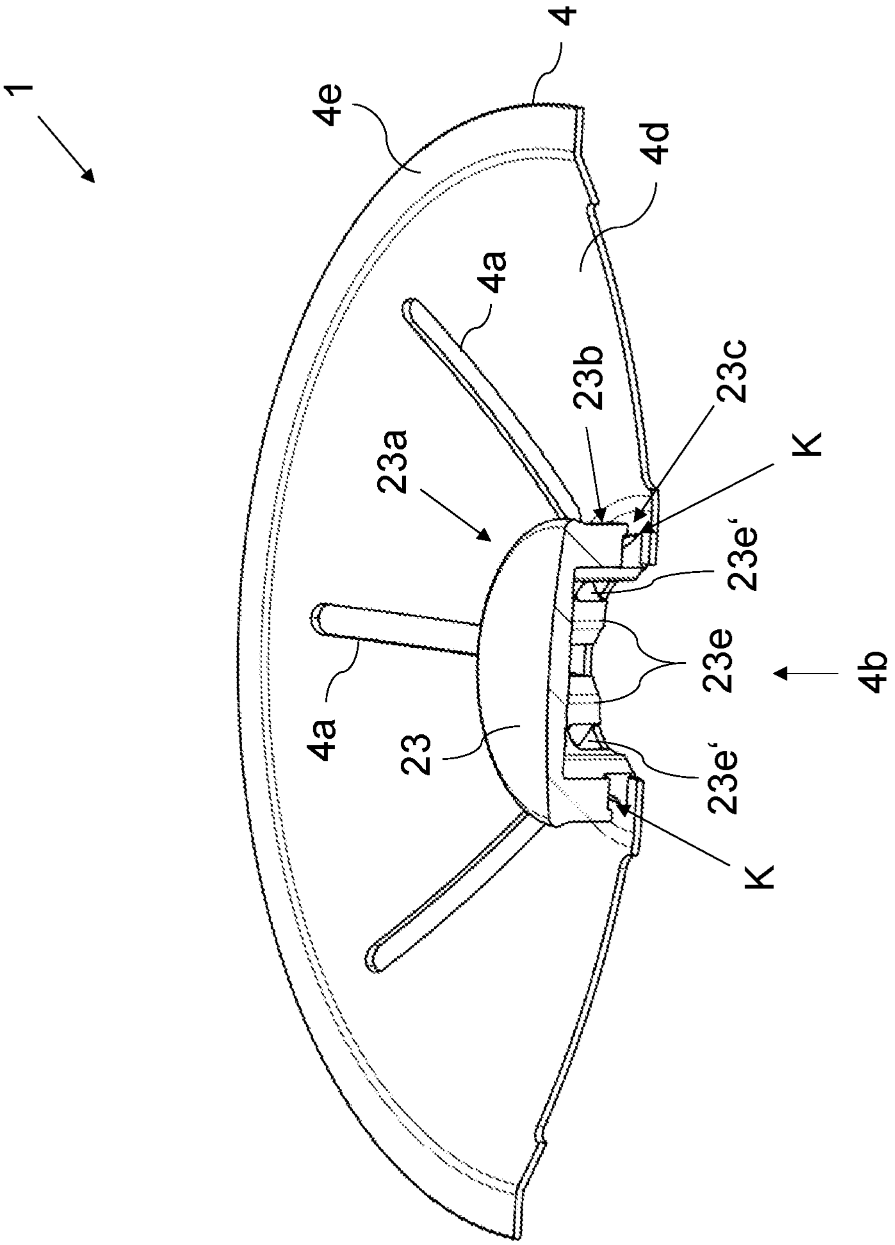
FIG. 13 shows a basket strainer according to an embodiment of this invention in cross-section.

FIGS. 11, 12 and 13 show a basket strainer according to an embodiment of this invention in an exploded view, in an overview and in cross-section.

FIGS. 11 to 13 substantially show a basket strainer 1 according to FIGS. 9 and 10. In contrast to basket strainer 1 according to FIGS. 9 and 10, the basket strainer 1 according to FIGS. 11 to 13 is in one piece. In particular, not only is the handle 23 in one part, but rather the handle 23 and sieve surface 4 are embodied together, more specifically, in one piece with one another. Thus, a snap ring 5 for fixation of the handle 23 is not required.

Figure 14:
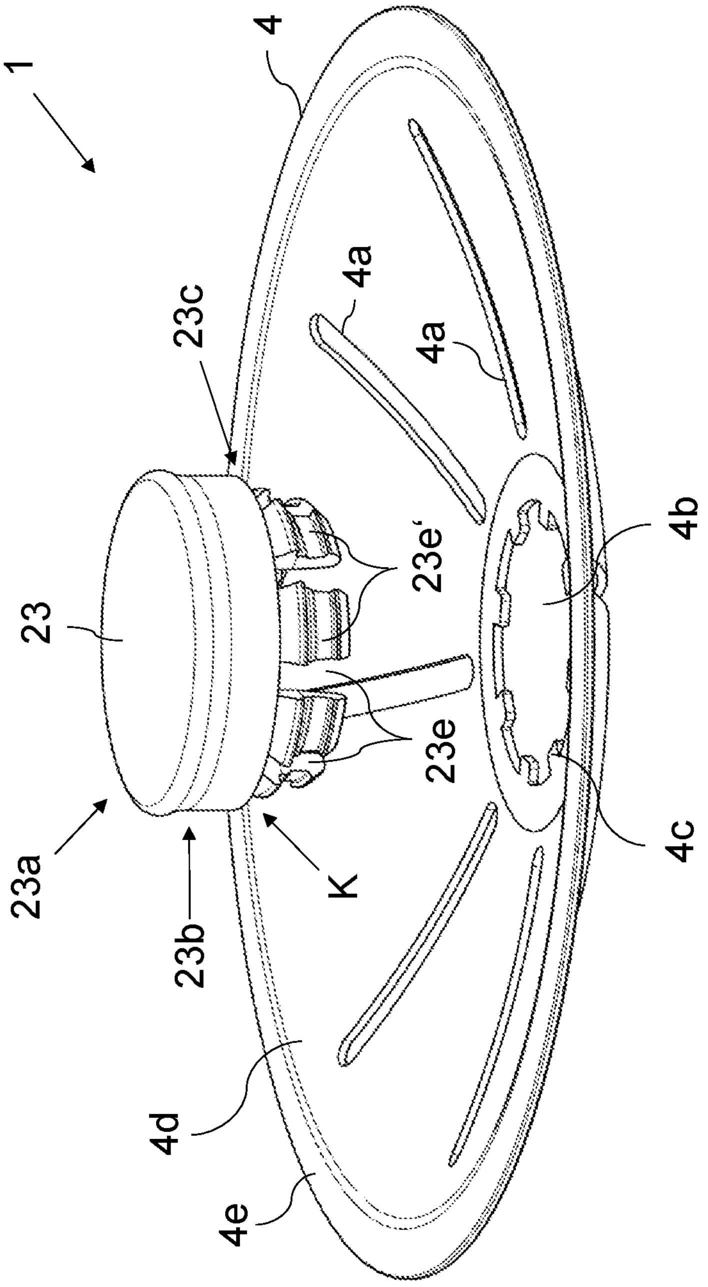
FIG. 14 shows a basket strainer according to an embodiment of this invention in an exploded view.
Figure 15:
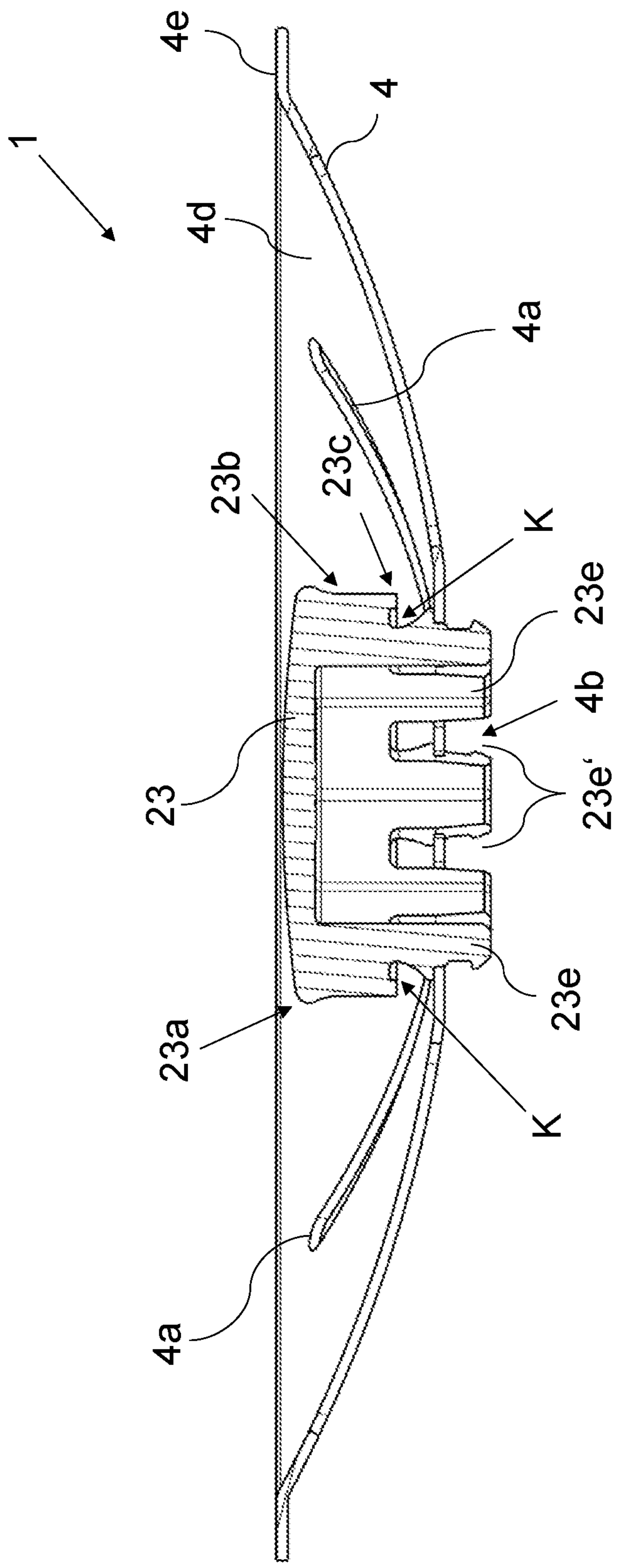
FIG. 15 shows a basket strainer according to an embodiment of this invention in in cross-section.

FIGS. 14 and 15 show a basket strainer according to an embodiment of this invention in an exploded view and in cross-section.

FIGS. 14 and 15 substantially show a basket strainer 1 according to FIGS. 11 to 13. In contrast to the basket strainer 1 according to FIGS. 11 to 13, the basket strainer 1 according to FIGS. 14 and 15 is in two parts with a handle 23 and a sieve surface 4. The handle 23 can be detachably fixed to the opening 4*b* of the sieve surface 4, in particular it can—as shown in FIGS. 14 and 15—be fixed by means of clipping, more specifically, a locking connection. The handle 23 and the sieve surface 4, more specifically, the opening 4*b* are embodied such that a snap ring 5 is not necessary for attaching the handle 23 on the sieve surface 4.

In summary, at least one embodiment of this invention has at least one of the following features and/or realized at least one of the following advantages:

Simple, cost-effective manufacture.

Splash guard.

Simple, reliable assembly.

Easy to clean.

Attractive look and feel.

Reliable removal of residual water.

Although this invention has been described with reference to preferred exemplary embodiments, it is not limited thereto and can be modified in a variety of ways.

LIST OF REFERENCES

1 Basket strainer
2 Cap
2*a* Upper region
2*b* Central region
2*c* Lower region
3 Base body
3*a* Upper region
3*b* Central region
3*c* Lower region
3*d* Projection lateral surface
3*e* Vertical bracket
3*e*' Vertical slot
3*f* Edge
4 Sieve surface
4*a* Radially extending slot
4*b* Central opening
4*c* Protrusion
4*d* Sloping surface
4*e* Outer edge
4*f* Flattened region
4*g* Web
4*h* Tooth
4*j* Opening web
5 Snap ring
5*a* Circumferential surface
5*b* Vertical projection
5*c* Indentation
5*e* Projection inner circumferential surface
23 Handle
23*a* Upper region
23*b* Central region
23*c* Lower region
23*e* Bracket
23*e*' Slot
A Drainage cup
F0, F1, F2 Flow direction of liquid
K Recess

The invention claimed is:

1. A sludge retention device for a drain of a sanitary basin, the sludge retention comprising:

a sieve surface which extends from a higher surface region to a lower surface region; and a handle which is arranged in the lower surface region on the sieve surface, wherein:

the handle includes a flow disruptor for a flow of a liquid in a direction of the lower surface region;

the flow disruptor is configured to at least partially break up the flow of the liquid in the lower surface region; and the flow disruptor is above the sieve surface.

2. The sludge retention device of claim 1, wherein the handle is detachably arranged on the sieve surface.

3. The sludge retention device of claim 1, wherein the handle is attachable to an opening of the sieve surface.

4. The sludge retention device of claim 3, wherein the handle and the opening are configured to prevent a rotation of the handle in the opening.

5. The sludge retention device of claim 3, wherein the opening has a clover leaf shape.

6. The sludge retention device of claim 1, wherein the handle includes a base body and a cap.

7. The sludge retention device of claim 6, wherein the handle is attachable to the sieve surface on different sides of the sieve surface.

8. The sludge retention device of claim 6, wherein the flow disruptor is arranged on the base body.

9. The sludge retention device of claim 6, wherein the cap is fixed to the base body by pressing or adhesive bonding.

10. The sludge retention device of claim 6, wherein the cap protrudes at least partially beyond the flow disruptor.

11. The sludge retention device of claim 6, wherein the base body includes radial projections that are circumferentially distributed.

12. The sludge retention device of claim 1, wherein the flow disruptor includes a recess.

13. The sludge retention device of claim 12, wherein the recess includes at least one edge of at least 90 degrees.

14. The sludge retention device of claim 1, wherein the handle includes a handle outlet opening.

15. The sludge retention device of claim 1, wherein the sieve surface includes sieve outlet openings for passage of the liquid.

16. The sludge retention device of claim 15, wherein the sieve outlet openings are arranged at least partially in the lower surface region.

17. The sludge retention device of claim 1, wherein the sieve surface includes a web protruding from the sieve surface.

18. The sludge retention device of claim 17, wherein the web includes web outlet openings.

19. The sludge retention device of claim 17, wherein the web is a ring around an opening of the sieve surface.

20. A drainage cup for use in a drain valve of a sanitary container, the drainage cup comprising the sludge retention device of claim 1.

* * * * *